United States Patent
Boissiere et al.

(10) Patent No.: US 10,947,918 B1
(45) Date of Patent: Mar. 16, 2021

(54) APPARATUS FOR CONTROLLING AN ENGINE DURING A SHIFT EVENT, POWERTRAIN INCLUDING SAME, AND METHOD

(71) Applicant: Honda Motor Co., Ltd., Tokyo (JP)

(72) Inventors: Andrew J. Boissiere, Hilliard, OH (US); Andrew G. Shapiro, Columbus, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/880,235

(22) Filed: May 21, 2020

(51) Int. Cl.
  *F02D 41/02* (2006.01)
  *F16H 63/50* (2006.01)
  *F02D 9/08* (2006.01)
  *F02D 41/00* (2006.01)

(52) U.S. Cl.
  CPC ........... *F02D 41/0225* (2013.01); *F02D 9/08* (2013.01); *F02D 41/0002* (2013.01); *F16H 63/502* (2013.01); *F02D 2200/021* (2013.01); *F02D 2200/101* (2013.01); *F02D 2200/50* (2013.01)

(58) Field of Classification Search
  CPC .... F02D 41/0225; F02D 41/0002; F02D 9/08; F02D 2200/021; F02D 2200/50; F02D 2200/101; F16H 63/502
  USPC .................. 123/399; 701/103, 110
  See application file for complete search history.

(56) References Cited

U.S. PATENT DOCUMENTS

| | | | |
|---|---|---|---|
| 5,063,510 A | 11/1991 | Jurgens et al. | |
| 5,443,594 A * | 8/1995 | Takada | B60W 30/18 477/98 |
| 5,546,907 A | 8/1996 | Komoriya et al. | |
| 5,682,864 A | 11/1997 | Shirakawa | |
| 6,345,607 B1 * | 2/2002 | Ozaki | F02D 41/04 123/486 |
| 6,470,854 B1 | 10/2002 | Hirata et al. | |
| 6,971,367 B2 | 12/2005 | Satou et al. | |
| 7,121,238 B2 | 10/2006 | Minami et al. | |
| 7,134,429 B2 | 11/2006 | Mader et al. | |
| 8,147,378 B2 | 4/2012 | Whitney et al. | |
| 9,752,523 B2 | 9/2017 | Yoshikawa et al. | |

(Continued)

FOREIGN PATENT DOCUMENTS

| | | |
|---|---|---|
| DE | 102009021387 A1 | 9/2010 |
| EP | 1369572 A2 | 12/2003 |

(Continued)

*Primary Examiner* — Hai H Huynh
(74) *Attorney, Agent, or Firm* — Kenealy Vaidya LLP

(57) ABSTRACT

A system can control an engine during a shift event of a multi-ratio transmission driven by the engine. The engine can include a throttle valve configured to selectively regulate a flow rate of air entering the engine. The system can include a controller configured to receive shift data indicative of an execution of the shift event by the multi-ratio transmission, receive first sensor data indicative of a temperature of the engine and second sensor data indicative of a temperature of the multi-ratio transmission, obtain a transient air value based on the temperature of the engine and the temperature of the multi-ratio transmission when the controller has received the shift data, and signal the throttle valve to move to a position corresponding to the transient air value when the controller has received the shift data.

20 Claims, 5 Drawing Sheets

(56) References Cited

U.S. PATENT DOCUMENTS

| | | | |
|---|---|---|---|
| 9,889,851 | B2 | 2/2018 | Nishida |
| 9,945,306 | B2 | 4/2018 | Tanaka et al. |
| 2016/0237939 | A1 | 8/2016 | Hagari et al. |
| 2017/0241353 | A1 | 8/2017 | Young et al. |
| 2019/0153967 | A1 | 5/2019 | Iwase |
| 2019/0285021 | A1 | 9/2019 | Suzuki et al. |

FOREIGN PATENT DOCUMENTS

| | | |
|---|---|---|
| JP | S63272932 A | 11/1988 |
| KR | 20050056518 A | 6/2005 |

* cited by examiner

APPARATUS FOR CONTROLLING AN ENGINE DURING A SHIFT EVENT, POWERTRAIN INCLUDING SAME, AND METHOD

BACKGROUND

The disclosed subject matter relates to an apparatus for controlling the operation of a vehicle powertrain. More particularly, the disclosed subject matter relates to methods and apparatus that control an internal combustion engine during a shift event of a multi-ratio transmission that is driven by the engine.

An internal combustion engine can output a torque that varies as a function of the rotational speed of the crankshaft. A dedicated computing device (also referred to as an electronic control unit ("ECU") or an engine control unit (ECU) can adjust operational parameters of the engine, such as but not limited to air intake rate, valve timing, valve lift duration, ignition timing, fuel injection timing, an amount of fuel supplied, etc., to regulate the torque output by the engine so that the engine can operate in an advantageously efficient manner based on the dynamic conditions of the vehicle, such as but not limited to engine load, vehicle speed, selected transmission gear ratio, etc.

During a shift from one gear ratio to another gear ratio of the transmission, the rotational speed of the engine can undergo a transient change such that the engine speed briefly increases. An operator and/or passenger(s) of the vehicle can have a negative perception of this increase in engine speed. This negative perception can be further exacerbated by the shift operation of the transmission in which the vehicle briefly decelerates and/or then briefly accelerates as one or more clutch mechanisms inside the transmission are actuated to execute the shift event.

SUMMARY

Some embodiments are directed to a system for controlling an engine during a shift event of a multi-ratio transmission driven by the engine. The engine can include a throttle valve configured to selectively regulate a flow rate of air entering the engine. The system can include a controller configured to receive shift data indicative of an execution of the shift event by the multi-ratio transmission, receive first sensor data indicative of a temperature of the engine and second sensor data indicative of a temperature of the multi-ratio transmission, obtain a transient air value based on the temperature of the engine and the temperature of the multi-ratio transmission when the controller has received the shift data, and signal the throttle valve to move to a position corresponding to the transient air value when the controller has received the shift data.

Some embodiments are directed to a powertrain for a vehicle that can include an engine, a transmission, and a controller. The internal combustion engine can be configured to output torque and can include a throttle valve configured to selectively vary a flow rate of intake air that enters the internal combustion engine. The transmission can be driven by the internal combustion engine. The transmission can include a plurality of gear ratios configured to selectively multiply the torque output by the internal combustion engine. The transmission can be configured to execute a shift event from a current gear selection to a target gear selection where the current gear selection is one of a plurality of gear selections, the target gear selection is a different one of the gear selections. The plurality of gear selections can include a park selection and a plurality of ratio selections, and each of the ratio selections corresponds to a respective one of the gear ratios. The controller can be configured to receive shift data indicative of an execution of the shift event by the transmission, receive first sensor data indicative of a temperature of the engine and second sensor data indicative of a temperature of the transmission, obtain a transient air value based on the temperature of the engine and the temperature of the transmission when the controller has received the shift data, and signal the throttle valve to move to a position corresponding to the transient air value when the controller has received the shift data.

Some embodiments are directed to a method for controlling an internal combustion engine during a shift event of a multi-ratio transmission driven by the internal combustion engine. The internal combustion engine can include a throttle valve configured to selectively vary a flow rate of intake air that enters the internal combustion engine. The method can include, during the shift event, obtaining a transient air value based on a temperature of the engine and a temperature of the multi-ratio transmission measured, and during the shift event, signaling the throttle valve to move to a position corresponding to the transient air value.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
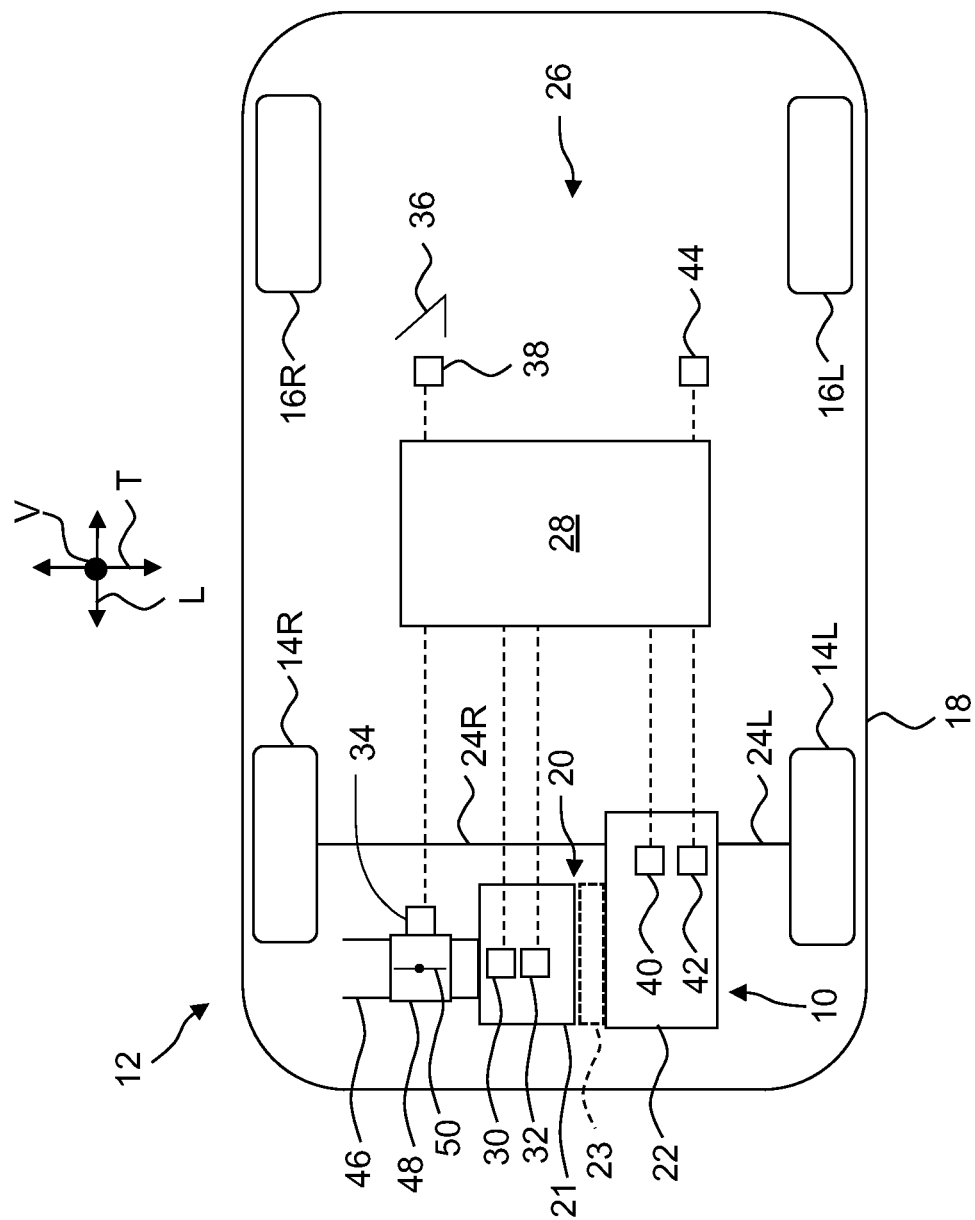
FIG. 1 is a schematic view of a vehicle including a system made in accordance with principles of the disclosed subject matter.

FIG. 1 schematically illustrates an embodiment of a system made in accordance with principles of the disclosed subject matter for managing the operation of a powertrain 10 of a vehicle 12. The vehicle 12 can have a longitudinal direction L, a transverse (or lateral) direction T perpendicular to the longitudinal direction L, and a vertical direction V perpendicular to both the longitudinal direction L and the transverse direction T. The vehicle 12 can include a pair of front wheels 14L, 14R, a pair of rear wheels 16L, 16L, and a main body 18.

The main body 18 can include a passenger compartment and a plurality of operator input components. The passenger compartment can be fully enclosed (for example, as with a truck, sport utility vehicle, sedan, tractor, or the like) or partially enclosed (for example, as with a convertible, a roadster, an All-Terrain Vehicle, a motorcycle, a tractor, a golf cart, or the like).

The powertrain 10 can be configured to drive either the front pair of wheels 14L, 14R, the rear pair of wheels 16L, 16R, both pairs 14L, 14R, 16L, 16R, or even a single wheel. The powertrain 10 can include a power source 20, a transmission 22, a drive output (such as a driveshaft, drive gear, or a pair of driveshafts 24L, 24R), and a control assembly 26.

The power source 20 can be configured as an internal combustion engine 21, or as a hybrid power source that includes the internal combustion engine 21 and an alternate power source 23 such as but not limited to an electric motor, an electric motor/generator, or an electric motor/generator that also functions as a starter motor for the engine 21. The engine 21 can include one or more cylinders in which a respective piston reciprocates. The piston(s) can drive a crankshaft that is rotatably mounted in the engine 21. The transmission 22 can be selectively driven by the crankshaft of the engine 21.

As will be described in detail below, the control assembly 26 can be used to control the operation of the engine 21 and the transmission 22. The control assembly 26 can be configured to modulate the speed of the engine 21 during a shift event of the transmission 22. This modulation can positively affect the brief change in engine speed that occurs during a shift event such that negative perception of the shift event can be improved or avoided by the operator and/or passenger of the vehicle 12.

The control assembly 26 can include a controller 28, an engine temperature sensor 30, an engine speed sensor 32, a throttle actuator 34, an accelerator pedal 36, a pedal position sensor 38, a transmission temperature sensor 40, a transmission actuator 42 and a gear selection device 44.

The controller 28 can be in electrical communication with each of the sensors 30, 32, 38, 40, the throttle actuator 34, the transmission actuator 42, and the gear selection device 44. The controller 28 can be referred to as an electronic control unit (ECU) or as a central processing unit (CPU). The controller 28 can be configured with hardware alone, or to run software, that permits the controller 28 to send, receive, process and store data and to electrically communicate with sensors, manual switches, actuators and/or other ECUs via electrical communication lines (not numbered—shown as dotted lines in FIG. 1). These lines can be in the form of wires or can be in the form of wireless communication signals. Electrical communication can be either one-way communication or two-way communication and can be networked or not networked in any appropriate manner.

A coolant fluid such as water or a combination of water and an anti-freeze agent mixed with water can circulate throughout the engine 21 and discharge heat absorbed from the engine 21 to a radiator. The engine temperature sensor 30 can be in thermal communication with the coolant fluid at a position along the fluid pathway such that a temperature detected by the engine temperature sensor 30 reflects an accurate operating temperature of the engine. The engine temperature sensor 30 can be configured to output data indicative of a temperature of the engine 21.

The engine speed sensor 32 can be mounted in the engine 21 and configured to detect the rotational speed of the crankshaft. The rotational speed of the crankshaft can be referred to as the engine speed. Either the engine speed sensor 32 or the ECU 28 can be configured to convert the raw data into speed data expressed in revolutions per minute. The engine speed sensor 32 can be any sensor capable of providing the appropriate data.

The engine of the power source 20 can include an air intake passage 46 and a throttle 48. The throttle 48 can include a valve 50 that moves between a fully closed position and a fully opened position and any position between the fully opened position and the fully closed position. FIG. 1 schematically illustrates the valve 50 in the fully opened position. The fully opened position can be referred to as wide open throttle (WOT) and each position of the valve 50 can be referred to as a fraction or percentage of WOT. The engine speed can increase as the valve 50 moves toward the fully opened position and the engine speed can decrease as the valve 50 moves toward the fully closed position.

The accelerator pedal 36 can be mechanically connected to the valve 50 and/or electrically connected to the valve 50 via the controller 28 and the throttle actuator 34. The operator of the vehicle 12 can move the accelerator pedal 36 in order to regulate the speed of the vehicle 12.

The throttle actuator 34 can be coupled to the valve 50 to cause the valve 50 to move between the fully closed position and the fully opened position. The throttle actuator 34 can be configured to move the valve 50 in response to a command signal issued by the controller 28. The controller 28 can be configured to generate and output the command signal based on data received from the pedal position sensor 38 and other appropriate input(s) received from other vehicle systems such as but not limited to an adaptive cruise control system, a traction control system, or a stability control system. As described in detail below, the controller 28 can be configured to generate and output a command signal to the throttle actuator 34 during a shift event of the transmission 22 to modulate the engine speed during the shift event.

The transmission 22 can contain a working fluid, such as but not limited to hydraulic oil or lubricating oil, that can be used to actuate, lubricate and/or cool the internal components of the transmission 22.

The transmission temperature sensor 40 can be mounted within the transmission 22 so that the sensor 40 is in thermal contact with the working fluid. The transmission temperature sensor 40 can be configured to output data indicative of a real-time temperature of the working fluid. Either the transmission temperature sensor 40 or the controller 28 can be configured to convert the raw data into a temperature of the working fluid. The transmission temperature sensor 40 can be any sensor capable of providing the appropriate data.

The gear selection device 44 can be connected to the transmission 22, electrically, mechanically, hydraulically, or elector-mechanically, in any appropriate manner such that actuation of the gear selection device 44 by the operator of the vehicle 12 can cause the transmission to perform a shift event in which the transmission actuator 42 shifts from one gear ratio to another gear ratio within the transmission 22. The gear selection device 44 can be a mechanical lever or an electrical switch. The gear selection device 44 can include an electrical switch or electrical button that has a dual functionality of selecting a "Drive" mode and a "Sport" mode for the transmission 22. In "Drive" mode, the transmission 22 can select the appropriate forward speed ratio based on a first shift map collection that includes one or more predetermined shift maps. In "Sport" mode, the transmission 22 can select the appropriate forward speed ratio based on a second shift map collection that includes one or more predetermined shift maps, and the second shift map collection can be different than the first shift map collection. For example, the first shift map collection can be directed toward providing a perception of comfort and/or fuel economy, and the second shift map collection can be directed toward increasing the dynamic performance and response of the vehicle 12 as compared to the dynamic response and performance of the vehicle 12 when the transmission 22 is in the "Drive" mode. However, alternate embodiments can include the gear selection device 44 configured as a mechanical lever that includes a plurality of positions with a one-to-one correspondence to a plurality of gear ratios such as but not limited to park, reverse, drive, neutral, and one or more specific forward gear ratios. Alternatively, or additionally, the gear selection device 44 can be movable in a sequential change mode in which movement of the gear selection device 44 in a first direction causes the transmission actuator 42 to perform an upshift event and in a second direction that causes the transmission actuator 42 to perform a downshift event.

In addition to performing a shift event in direct response to an operator's signal to the gear selection device 44, the transmission 22 can be configured as an automatic transmission or a semi-automatic transmission such that the transmission 22 can perform a shift event based on electronic signals from the controller 28 or a separate controller that is dedicated to the operation of the transmission 22. The shift event can be selected and performed based on one or more shift maps stored in a memory device that is integrated with the controller 28 or the dedicated transmission controller or in electrical communication with either or both controllers, as appropriate.

Figure 3:
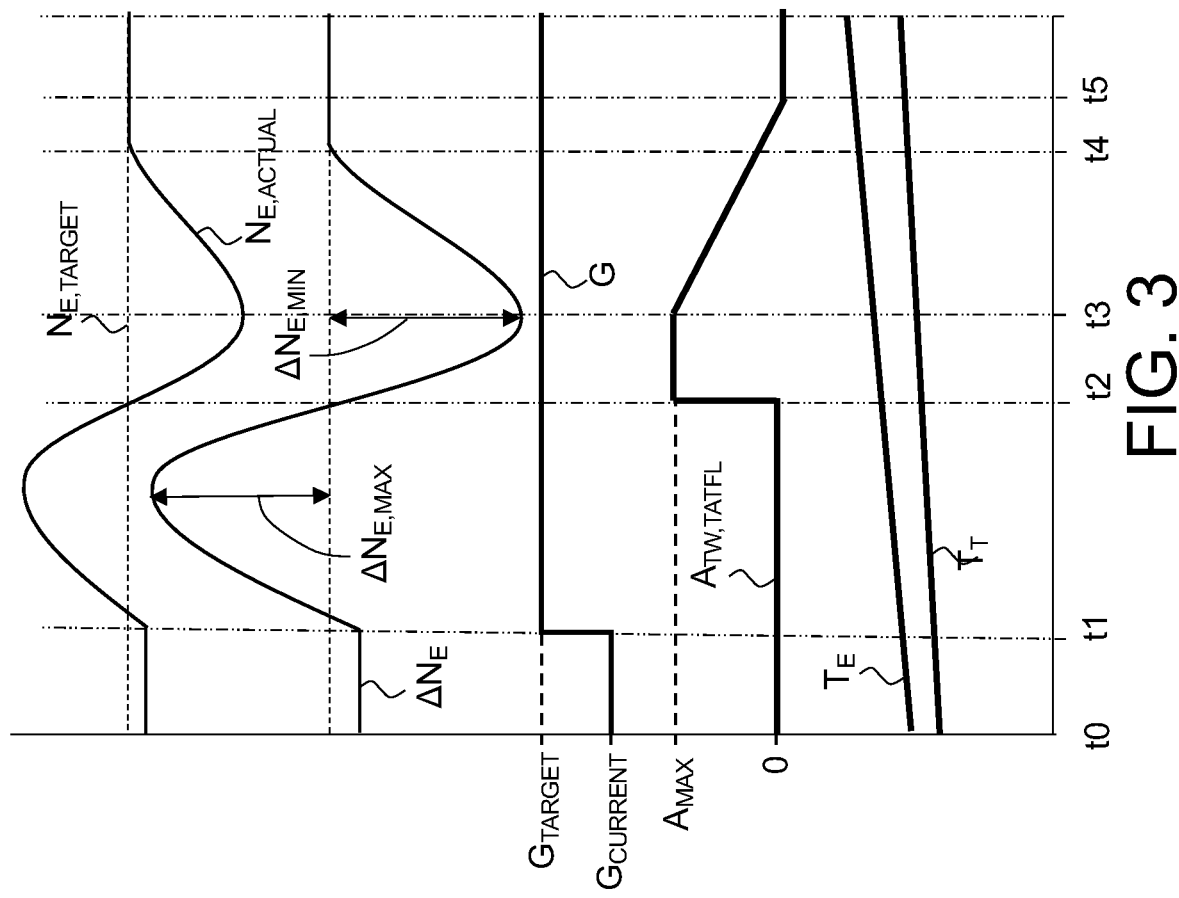
FIG. 3 is a graph depicting an operational event executed by the system of FIG. 1.

The engine 21 can experience a transient change in engine speed during a shift event performed by the transmission 22. The top half of FIG. 3 shows an exemplary plot of engine speed $N_E$ and an exemplary plot of an engine speed difference $\Delta N_E$ before, during and after the shift event. The plot of the engine speed $N_E$ can reflect data obtained by the controller 28 from the engine speed sensor 32. The plot of the engine speed difference $\Delta N_E$ can be derived by the controller 28 by calculating a difference between the actual engine speed $N_{E,ACTUAL}$ and a predetermined target engine speed $N_{E,TARGET}$. The target engine speed $N_{E,TARGET}$ can be a constant value as depicted by the dotted line in FIG. 3. The target speed $N_{E,TARGET}$ can vary as a function of the currently selected gear ratio and/or the target gear ratio for the transmission shift event and/or engine temperature $T_E$. The target engine speed $N_{E,TARGET}$ can be stored in a memory device such as a ROM storage device, EEPROM storage device, or a RAM storage device that is integrated with or otherwise in electrical communication with the controller 28.

Figure 2:
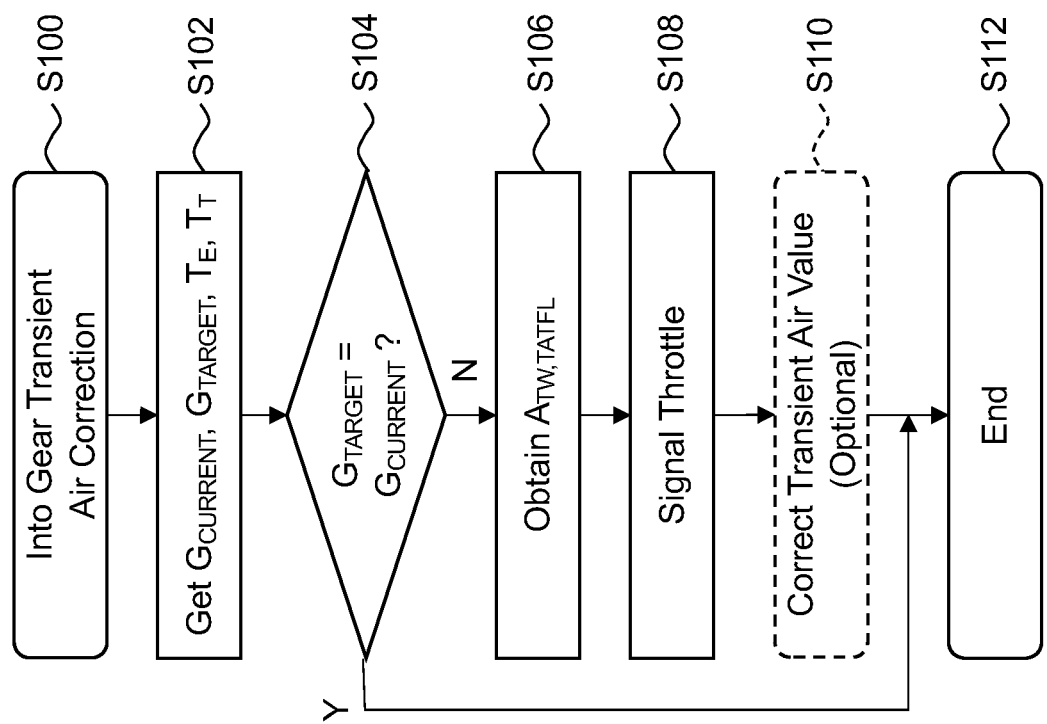
FIG. 2 is a flow chart that can be performed by the system of FIG. 1.
Figure 4:
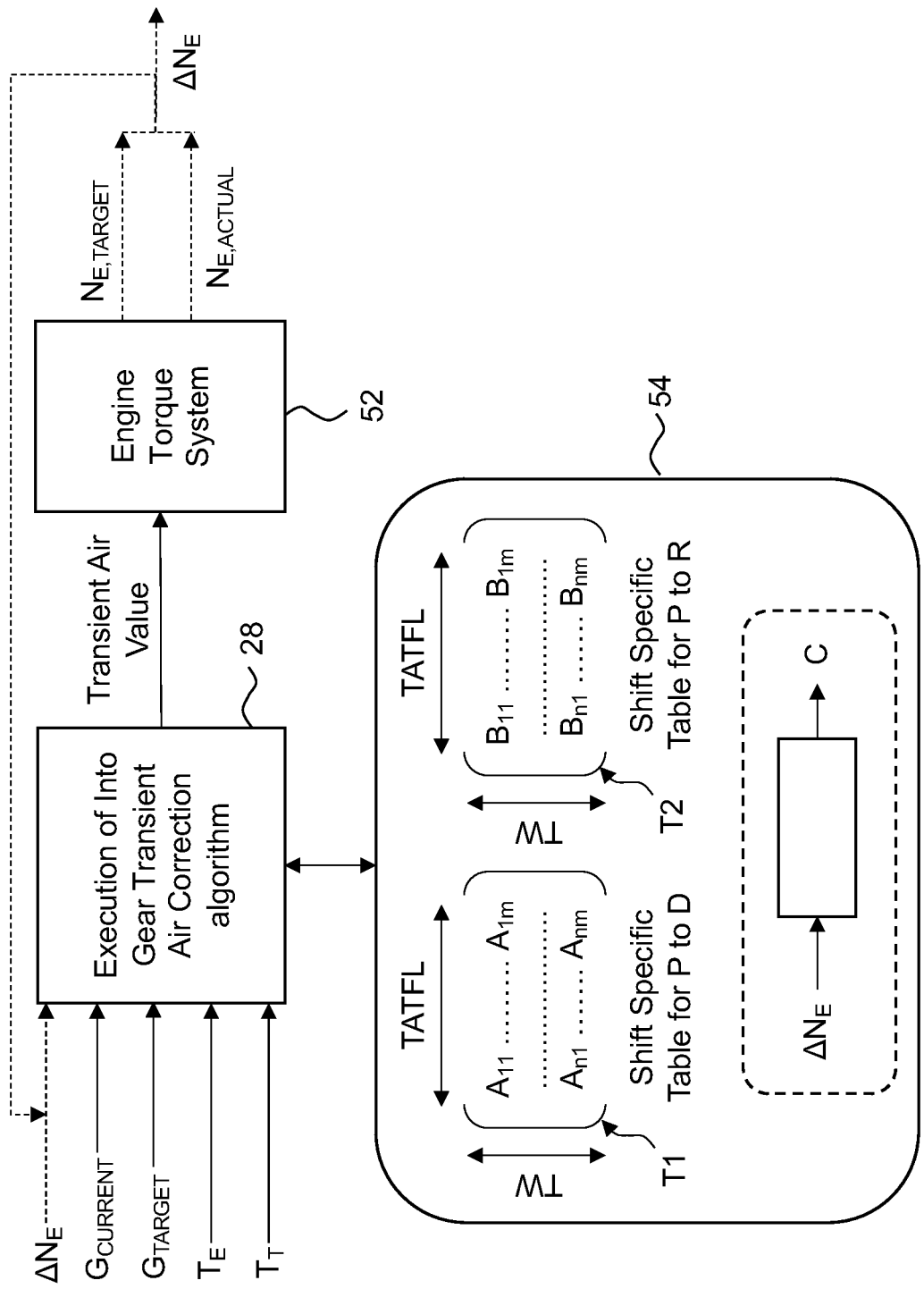
FIG. 4 is a schematic illustration of an exemplary data flow during an exemplary operation of the system of FIG. 1.

The controller 28 can be configured with hardware alone or a combination of hardware and software that permits the controller 28 to adjust the amount of air that flows into the engine of the power source 20 during a shift event of the transmission 22. Specifically, the controller 28 can be configured to increase the amount of air that flows into the engine 21 to reduce or eliminate the transient change in engine speed. FIG. 2 illustrates an exemplary algorithm that utilizes engine and transmission temperatures as variable inputs and the controller 28 can execute during a shift event of the transmission 22. FIG. 3 illustrates plots of various parameters during execution of the shift event by the transmission 22 and the algorithm of FIG. 2. FIG. 4 illustrates an exemplary flow of data (such as but not limited to engine temperature $T_E$, transmission temperature $T_T$, and engine speed difference $\Delta N_E$ from the previous transmission gear ratio shift event) and command signals into and out of the controller 28 during operation of the algorithm of FIG. 2.

The Into Gear Transient Air Correction algorithm of FIG. 2 can permit the controller 28 to signal the throttle actuator 34 to move the valve 50 to a predetermined position such that a predetermined amount of air can enter the engine 21. This predetermined amount of air can advantageously affect the transient change in the actual engine speed $N_{E,ACTUAL}$. For example, the predetermined amount of air can reduce the magnitude of the transient variation between the actual engine speed $N_E$ and the target engine speed $N_{E,TARGET}$.

Referring to FIG. 2, the controller 28 can enter the Into Gear Transient Air Correction algorithm at step S100 at prescribed time intervals. The controller 28 can then proceed to step S102.

At step S102, the controller 28 can get data indicative of the input parameters that the controller 28 can use at step S104 to determine whether to continue execution the Into Gear Transient Air Correction algorithm or exit the algorithm. The input parameters can include but are not limited to a current gear ratio $G_{CURRENT}$ in which the transmission 22 is operating, a target gear ratio $G_{TARGET}$ to which the transmission 22 will shift as a result of an impending shift event, an engine temperature $T_E$ and a transmission temperature $T_T$. The transmission actuator 42 and/or the gear selection device 44 can provide the controller 28 with the data indicative of the current gear ratio $G_{CURRENT}$ and the target gear ratio $G_{TARGET}$. The engine temperature sensor 30 can provide controller 28 with the data indicative of the engine temperature $T_E$. The transmission temperature sensor 40 can provide the controller 28 with the data indicative of the transmission temperature $T_T$. FIG. 2 illustrates a feedforward control system for the gear shift ambient air control. FIG. 4 schematically shows the input of this exemplary data into the controller 28 during execution of the Into Gear Transient Air Correction algorithm and the algorithm is performed as a feedback control.

If the controller 28 determines that the target gear ratio $G_{TARGET}$ is equal to the current gear ratio, $G_{CURRENT}$, then it is determined that the transmission 22 is not performing a shift event. For example, the value of the shift signal can correspond to the current gear ratio $G_{CURRENT}$ from the time interval between an initial time t0 and shift event start time t1. Thus, there is no target gear ratio $G_{TARGET}$ to consider in the time interval between t0 and t1, and a shift event of the transmission 22 is not impending. Since the transmission 22 will not perform a shift event at this time, normal operation of the engine 21 can be more advantageous. Thus, the controller 28 can proceed to step S112 and can exit the Into Gear Transient Air Correction algorithm.

If the controller determines that the target gear ratio $G_{TARGET}$ is not equal to the current gear ratio $G_{Current}$, then the controller 28 determines that the transmission is about to perform or is performing a shift event. For example, FIG. 3 shows an exemplary shift event occurring at the shift event start time t1 where the shift signal G changes from the current gear ratio $G_{CURRENT}$ to the target gear ratio $G_{TARGET}$. The target gear ratio $G_{TARGET}$ can be generated by any appropriate device such as but not limited to the controller 28, the dedicated transmission controller, the transmission actuator 42, or the gear selection device 44. Selection of the target gear ratio $G_{TARGET}$ can be based on one or more transmission maps described above, or generated in response to a manual input to the gear selection device 44 by an operator of the vehicle 12. Thus, the controller 28 can proceed to step S106 and continue to execute the Into Gear Transient Air Correction algorithm.

It is possible for the engine 21 and the transmission 22 to warm up at different rates during operation of the vehicle 12. The difference between the operating temperatures of the engine 21 and the transmission 22 can adversely impact the advantageous modulation of the engine speed $N_E$ during the shift event. Thus, at step S106, the controller 28 can obtain a transient air value $A_{TW,TATFL}$ based on an engine temperature $T_E$, and a transmission temperature $T_T$ detected by the engine temperature sensor 30 and the transmission temperature sensor 40, respectively. The controller 28 can be configured to obtain the transient air value $A_{TW,TATFL}$ by accessing a look-up table stored in a memory storage device described above. The look-up table can include a plurality of predetermined different values for the transient air value, $A_{TW,TATFL}$ that are based on experimental data and/or based on one or more predetermined calculations.

FIG. 4 shows an exemplary first table T1 that can be stored in a memory storage device 54. The memory storage device can be any appropriate memory storage device described above. The first table T1 can include n columns and m rows of different predetermined values $A_{11}$ to $A_{nm}$ for the transient air value $A_{TW,TATFL}$. However, any number of tables can be predetermined and referenced as described below. The controller 28 can be configured to select an appropriate one of the n rows based on the temperature TW in the first table T1 that corresponds to the engine temperature $T_E$. The controller 28 can be configured to select an appropriate one of the m columns based on the temperature TATFL in the first table T1 that corresponds to the transmission temperature $T_T$. The controller 28 can be configured to obtain the transient air value $A_{TW,TATFL}$ by selecting the predetermined value from the first table T1 that corresponds to both of the selected temperature values TW, TATFL. After obtaining the transient air value $A_{TW,TATFL}$, the controller 28 can proceed to step S108.

At step S108, the controller 28 can generate and output a transient air amount signal. FIG. 4 shows the controller 28 outputting the transient air amount signal to an engine torque system 52 during step S108 of FIG. 2. The transient air amount signal can be based on the transient air value $A_{TW,TATFL}$ obtained by the controller 28 in step S106.

The engine torque system 52 can include the engine 21, the engine speed sensor 32, the throttle actuator 34, the throttle 48 and the valve 50. The transient air amount signal can cause the throttle actuator 34 to move the valve 50 to a position that causes a predetermined amount (measured in mass, volume, mass flow rate or volumetric flow rate) of air to enter the engine 21 that reflects the transient air value $A_{TW,TATFL}$. The engine torque system 52 can include a separate algorithm that is executed by the controller 28 and that permits the controller 28 to control the fuel supply to the engine 21, the ignition timing of the spark plug(s), and the valve timing and lift of the poppet valves of the engine 21. The separate algorithm of the engine torque system 52 can permit the controller 28 to modulate the valve 50 under conditions different from those for the Into Gear Transient Air Correction algorithm.

As will be described in further detail below, step S110 is an optional step of the Into Gear Transient Air Correction algorithm. Thus, the controller 28 can proceed to step S112 after signaling the throttle actuator 34 at step S108 and exit the Into Gear Transient Air Correction algorithm.

Referring to FIG. 3, the Into Gear Transient Air Correction algorithm can permit the controller 28 to signal the throttle actuator 34 at a signal start time t2, which occurs after a predetermined time interval after the shift event start time t1. This delay in the signal start time t2 after the shift event start time t1 can be predetermined to specifically address the decelerating portion of the transient speed change of the engine 21. For example, the exemplary signal start time t2 shown in FIG. 3 can correspond to the point of inflection of the plot of the actual engine speed $N_{E,ACTUAL}$ or the plot of the difference in engine speed $\Delta N_E$ where the actual engine speed $N_{E,ACTUAL}$ changes from being greater than the target engine speed $N_{E,TARGET}$ to being less than the target engine speed $N_{E,TARGET}$.

The transient air value $A_{TW,TATFL}$ can vary over time. For example, FIG. 3 shows an exemplary signal for the transient air value $A_{TW,TATFL}$ in which the transient air value $A_{TW,TATFL}$ has an initial maximum value $A_{MAX}$ until a first interim time t3. From the first interim time t3 to signal end time t5, the value of the transient air value $A_{TW,TATFL}$ can decrease linearly according to a predetermined rate from the maximum value $A_{MAX}$ to a zero value also referred to as a signal off state. The signal end time t5 can be a predetermined time after the actual engine speed $N_{E,ACTUAL}$ returns to the target engine speed $N_{E,TARGET}$ at a second interim time t4.

Thus, steps S100 through S108 can provide the controller 28 with the ability of modulating the air flow into the engine 21 in order to reduce the transient speed changes in the engine speed during a shift event of the transmission 22. This special modulation of the air intake amount for the engine 21 can improve an operator's and/or a passenger's perception of the operation of the engine 21 and/or the transmission 22.

Alternate embodiments of the Into Gear Transient Air Correction algorithm can include use of the current gear ratio $G_{CURRENT}$ and the target gear ratio $G_{TARGET}$ in order to obtain an advantageous transient air value $A_{TW,TATFL}$. The controller 28 or an external storage device described above can include a plurality of tables, one for each possible different shift event. FIG. 4 shows two exemplary tables T1, T2 where T1 includes predetermined values $A_{11}$ to $A_{nm}$ that are specific for a shift from park P to drive D and T2 includes predetermined values $B_{11}$ to $B_{nm}$ that are specific for a shift from park P to reverse R. Alternate embodiments can include any appropriate number of tables in order to advantageously and respectively address a plurality of different shift events for the transmission. For example, a respective table can be created for each different shift event of the transmission. Alternate embodiments can include any appropriate number of tables such that the controller 28 can obtain the transient air value $A_{TW,TATFL}$ from the same table for at least two different shift events.

Alternate embodiments of the Into Gear Transient Air Correction algorithm can include an algorithm that can modify the predetermined values stored in one or more of the tables, such as tables T1, T2 described above. The predetermined values $A_{11}$ to $A_{nm}$ and the predetermined values $B_{11}$ to $B_{nm}$ stored in the exemplary tables T1, T2 can be predetermined empirically or theoretically. Nonetheless, it is possible that any one of the predetermined values $A_{11}$ to $A_{nm}$ stored in the first table T1 and/or any one of the predetermined values $B_{11}$ to $B_{nm}$ stored in the second table T2 does not provide the desired effect for the actual engine speed $N_{E,ACTUAL}$. For example, the first table T1 might not take into account variations in other factors such as but not limited to air density, air humidity, fuel quality, contaminants in the intake air, and engine load. Thus, it is possible that the vehicle 12 can be experiencing one or more conditions that is/are not reflected in the predetermined values $A_{11}$ to $A_{nm}$ stored in the first table T1.

As described above, the Into Gear Transient Air Correction algorithm of FIG. 2 can include an optional step S110. Step S110 can be a subroutine that can permit the controller 28 to update one or more of the predetermined values $A_{11}$ to $A_{nm}$ stored in the first table T1 so that during the next iteration of the Into Gear Transient Air Correction algorithm, the transient air value $A_{TW,TATFL}$ obtained by the controller 28 can more effectively modulate the engine speed $N_E$ during a subsequent execution of the same type of shift event. Step S110 can be applicable to each table if there are more than one table of data such as the first and second tables T1, T2.

Figure 5:
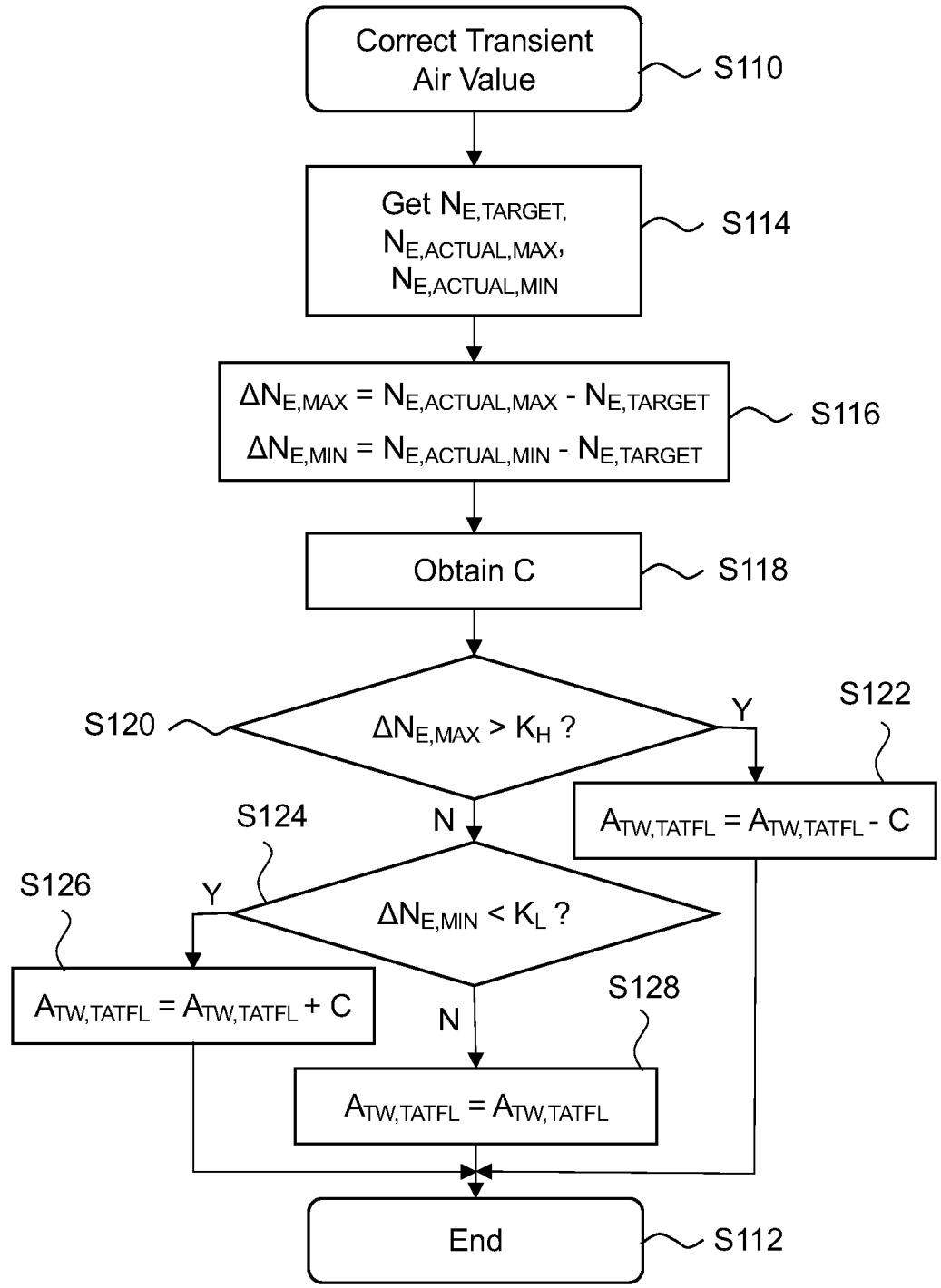
FIG. 5 is a flowchart of an exemplary correction operation for the system of FIG. 1.

FIG. 5 illustrates an exemplary Correct Transient Air Value algorithm that the controller 28 can perform in order to update the predetermined values $A_{11}$ to $A_{nm}$ stored in each data table such as the first and second tables T1, T2. The controller 28 can perform the Correct Transient Air Value algorithm at step S110 as a subroutine of the Into Gear Transient Air Correction algorithm of FIG. 2. However, alternate embodiments can include a controller 28 that executes the Correct Transient Air Value algorithm after completion of the Into Gear Transient Air Correction algorithm of FIG. 2.

The controller 28 can enter the Correct Transient Air Value algorithm at step S110. Then controller 28 can be configured to proceed to step S114.

At step S114, the controller 28 can retrieve the target engine speed $N_{E,TARGET}$ and the engine speed NE from the memory storage device 54. The controller 28 can be configured to continuously receive and store the engine speed $N_E$ output by the engine speed sensor 32 before, during and after each shift event performed by the transmission 22. Thus, the engine speed $N_E$ can include a plurality of values for the engine speed $N_E$ as shown by way of example in FIG. 3. During step S114, the controller 28 can be configured to analyze the plurality of values for the engine speed $N_E$ and determine a maximum engine speed $N_{E,ACTUAL,MAX}$ and a minimum engine speed $N_{E,ACTUAL,MIN}$ that occurred during the shift event most recently performed by the transmission 22. The controller 28 can be configured to proceed to step S116 after determining the maximum engine speed $N_{E,ACTUAL,MAX}$ and the minimum engine speed $N_{E,ACTUAL,MIN}$.

The maximum engine speed $N_{E,ACTUAL,MAX}$ and the minimum engine speed $N_{E,ACTUAL,MIN}$ can be absolute values. At step S116, the controller 28 can be determined to relate the maximum engine speed $N_{E,ACTUAL,MAX}$ and the minimum engine speed $N_{E,ACTUAL,MIN}$ to the target engine speed $N_{E,TARGET}$ to better determine the effectiveness of the most recently executed transient air value $A_{TW,TATFL}$. The controller 28 can be configured to determine a maximum engine speed difference $\Delta N_{E,MAX}$ and a minimum engine speed difference $\Delta N_{E,MIN}$ by subtracting the target engine speed $N_{E,TARGET}$ from each of the maximum engine speed $N_{E,ACTUAL,MAX}$ and the minimum engine speed $N_{E,ACTUAL,MIN}$. Thus, the maximum engine speed difference $\Delta N_{E,MAX}$ can be a positive value and the minimum engine speed difference $\Delta N_{E,MIN}$ can be a negative value. Then, the controller 28 can be configured to proceed to step S118.

At step S118, the controller 28 can be configured to obtain a correction factor value C. The correction factor value C can be any appropriate value that can modify an appropriate one(s) of the predetermined values for the transient air value, such as but not limited to the predetermined values $A_{11}$ to $A_{nm}$ stored in the first table T1 and the predetermined values $B_{11}$ to $B_{nm}$ stored in the second table T2. The correction factor value C can a predetermined value or a variable value that is determined by the controller 28 based on a predetermined mathematical equation. The correction factor value C or the predetermined mathematical equation can be stored in the memory storage device 54. For example, the controller 28 can be configured to retrieve the correction factor value C from a table that includes a plurality of correction factor values that are indexed according to values for the engine the maximum engine speed $N_{E,ACTUAL,MAX}$ and the minimum engine speed $N_{E,ACTUAL,MIN}$. Then the controller 28 can be configured to proceed to step S120.

At step S120, the controller 28 can be configured to determine whether the maximum engine speed difference $\Delta N_{E,MAX}$ is greater than a predetermined maximum threshold $K_H$. The predetermined maximum threshold $K_H$ can correspond to a value of the engine speed difference $\Delta N_E$ above which the Into Gear Transient Air Correction algorithm of FIG. 2 might not advantageously modulate the engine speed during a shift event of the transmission 22. If the controller 28 determines that the maximum engine speed difference $\Delta N_{E,MAX}$ is greater than the maximum threshold $K_H$, then the controller 28 can be configured to proceed to step S122. If the controller 28 determines that the maximum engine speed difference $\Delta N_{E,MAX}$ is less than or equal to the maximum threshold $K_H$, then the controller 28 can configured to proceed to step S124.

At step S122, the controller 28 can be configured to adjust the value of the transient air value $A_{TW,TATFL}$ used in the latest iteration of the Into Gear Transient Air Correction algorithm. At step S122, the controller 28 can be configured to replace the most recently used value of the transient air value $A_{TW,TATFL}$ with the difference between the mostly recently used value of the transient air value $A_{TW,TATFL}$ and the correction factor value C. Then, the controller 28 can be configured to proceed to step 112 where the controller 28 can exit the Correct Transient Air Value algorithm and the Into Gear Transient Air Correction algorithm of FIG. 2.

At step 124, the controller 28 can be configured to determine whether the minimum engine speed difference $\Delta N_{E,MIN}$ is less than a predetermined minimum threshold $K_L$. Since the minimum engine speed difference $\Delta N_{E,MIN}$ can be a negative value, the minimum threshold $K_L$ can be a negative value. Alternatively, the minimum engine speed value can be an absolute value and the minimum threshold $K_L$ can be a positive value. The predetermined minimum threshold $K_L$ can correspond to a value of the engine speed difference $\Delta N_E$ below which the Into Gear Transient Air Correction algorithm of FIG. 2 might not advantageously modulate the engine speed during a shift event of the transmission 22. If the controller 28 determines that the minimum engine speed difference $\Delta N_{E,MIN}$ is less than the minimum threshold $K_L$, then the controller 28 can be configured to proceed to step S126. If the controller 28 determines that the minimum engine speed difference $\Delta N_{E,MIN}$ is greater than or equal to the minimum threshold $K_L$, then the controller 28 can configured to proceed to step S128.

At step S126, the controller 28 can be configured to adjust the value of the transient air value $A_{TW,TATFL}$ used in the latest iteration of the Into Gear Transient Air Correction algorithm. At step S126, the controller 28 can be configured to replace the most recently used value of the of the transient air value $A_{TW,TATFL}$ with the sum of the mostly recently used value of the transient air value $A_{TW,TATFL}$ and the correction factor value C. Then, the controller 28 can be configured to proceed to step 112 where the controller 28 can exit the Correct Transient Air Value algorithm and the Into Gear Transient Air Correction algorithm of FIG. 2.

At step S128, the controller 28 can determine that the most recently used value of the of the transient air value $A_{TW,TATFL}$ likely provided an advantageous modulation of the engine speed during the shift event. Thus, the controller 28 can maintain the most recently used value of the of the transient air value $A_{TW,TATFL}$ without modification by the correction factor value C. Then, the controller 28 can be configured to proceed to step 112 where the controller 28 can exit the Correct Transient Air Value algorithm and the Into Gear Transient Air Correction algorithm of FIG. 2.

Figure 6:
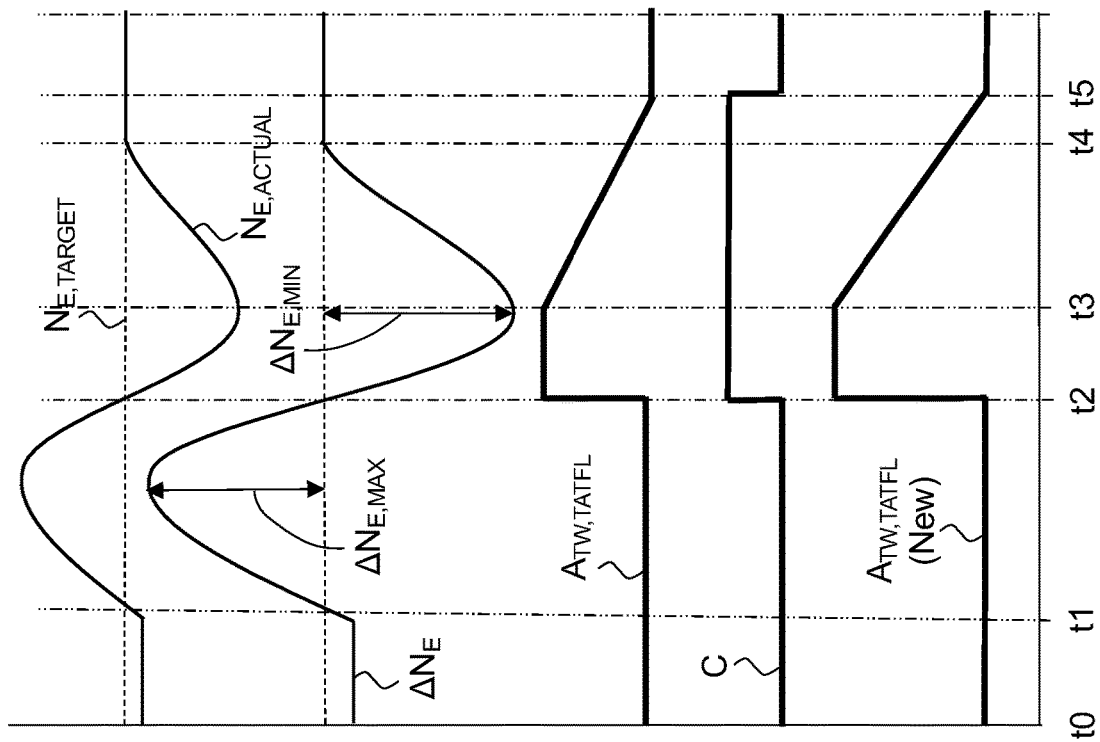
FIG. 6 is a graph depicting an exemplary operational event executed by the system of FIG. 1 from which a corrected signal is determined in accordance with the correction operation of FIG. 5.

FIG. 6 illustrates an exemplary iteration of the Into Gear Transient Air Correction algorithm of FIG. 2 in which the resulting maximum engine speed difference $\Delta N_{E,MAX}$ was acceptable (i.e., less than or equal to the maximum threshold $K_H$ and "No" at step S120). However, the minimum engine speed difference $\Delta N_{E,MIN}$ was less than the minimum threshold (i.e., "Yes" at step S124). Thus, controller 28 can add the correction factor value C to the transient air value $A_{TW,TATFL}$ in accordance with step S126.

Since the transient air value $A_{TW,TATFL}$ can vary over time, the correction factor value C can have a signal value per unit. The correction factor value C can have constant signal value as shown in FIG. 6 where the correction factor value C has a value of zero from the shift event start time t1 to the signal start time t2 and a constant value from the signal start time t2 to the signal end time t5 of the signal for the transient air value $A_{TW,TATFL}$. FIG. 6 shows a new signal for the transient air value $A_{TW,TATFL}$ that is the result of adding the signal of the correction factor value C to the signal of the most recently used value of the transient air value $A_{TW,TATFL}$.

Figure 7:
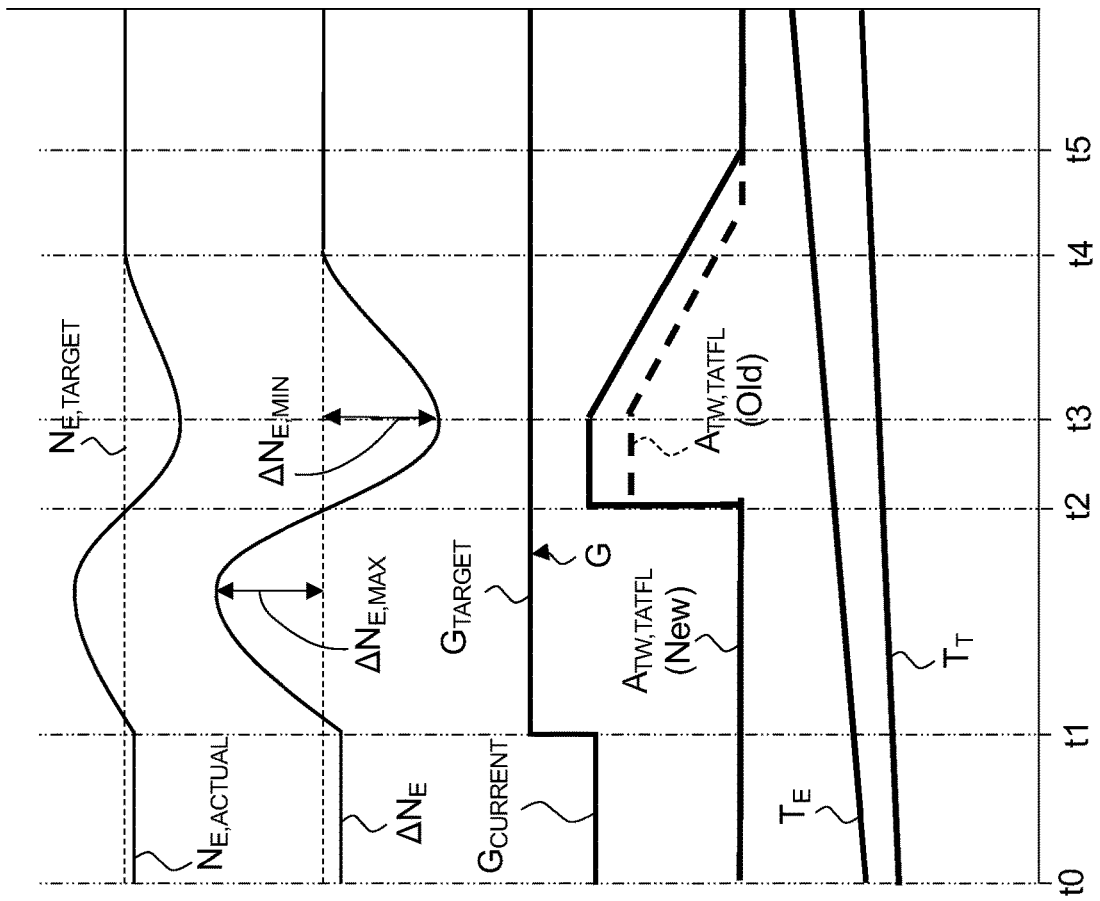
FIG. 7 is a graph of an exemplary operational event during which the corrected signal is applied by the system of FIG. 1.

FIG. 7 illustrates an exemplary shift event that uses the new signal for the transient air value $A_{TW,TATFL}$ that was modified by the controller 28 at step S126. Comparing the plots of the actual engine speeds and the engine speed differences of FIGS. 6 and 7 can show the advantageous effect of modifying the transient air value $A_{TW,TATFL}$ in accordance with the Correct Transient Air Value algorithm of FIG. 5. The modified signal for the transient air value $A_{TW,TATFL}$ can reduce the peak and valley of the two curves (representing $N_{E,ACTUAL}$ and $\Delta N_E$) as compared to the plots shown in FIG. 6. Thus, the Correct Transient Air Value algorithm can dynamically refine the ability of the controller 28 to advantageously modulate the air intake amount for the engine 21 during a shift event of the transmission 22.

While certain embodiments of the invention are described above, it should be understood that the invention can be embodied and configured in many different ways without departing from the spirit and scope of the invention.

For example, embodiments are disclosed above in the context of the powertrain 10 of the vehicle 12 shown in FIG. 1, where the engine 21 is mounted at the front of the vehicle 12 and the crankshaft axis of the engine 21 extends in the transverse direction T of the vehicle 12. However, embodiments are intended to include or otherwise cover any type of powertrain typically used in vehicle applications. For example, the engine 21 can have the crankshaft axis oriented in the longitudinal direction L or in the traverse direction T of the vehicle 12. The engine 21 can be mounted forward of the front driveshafts 24L, 24R, rearward of the axles of the rear wheels 16L, 16R, or intermediate the front driveshafts 24L, 24R and the rear axles.

The transmission 22 can include an input shaft, an output shaft, and a speed ratio assembly that selectively couples the output shaft to the input shaft. A coupling can connect the engine crankshaft to the input shaft. The coupling can permit selective engagement/disengagement of the input shaft with the engine crankshaft, or at least relative rotation of the engine crankshaft with respect to the input shaft, in any appropriate manner. Exemplary couplings can include, but are not limited to, a friction disc clutch and a torque converter.

The speed ratio assembly can connect the input shaft to the transmission output shaft such that the transmission output shaft can rotate at variable speeds relative to the input shaft. The speed ratio assembly can be a stepped speed ratio assembly or a continuously variable speed ratio assembly, as is known in the art.

Alternatively, the transmission temperature sensor 40 and transmission actuator 42 can be in electrical communication with the dedicated transmission controller described above that is different from the controller 28. The dedicated transmission controller can be in electrical communication with the controller 28. The dedicated transmission controller can be configured to receive processed data from the transmission temperature sensor 40 or to receive the raw data from the transmission temperature sensor 40 and process the raw data to indicate a temperature of the transmission 22. Then, the dedicated transmission controller can electrically communicate the processed data to the controller 28.

The gear selection device 44 can be mounted in any one of a plurality of different locations within the vehicle 12, including but not limited to, on the center console, on the steering column, on the steering wheel, and on the instrument panel.

Alternate embodiments can include the data reflecting engine speed $N_E$ and the engine speed difference $\Delta N_E$ processed and stored by the engine torque system 52. For example, the engine speed sensor 32 can be configured to output its data to any appropriate memory storage device.

Exemplary embodiments are also intended to cover execution of steps S100 to S112 of the Into Gear Transient Air Correction algorithm and the steps S110 to S128 of the Correct Transient Air Value algorithm by the controller 28 in any order relative to one another. And, any of the steps S100-S128 can be omitted, as desired.

What is claimed is:

1. A system for controlling an engine during a shift event of a multi-ratio transmission driven by the engine, the engine including a throttle valve configured to selectively regulate a flow rate of air entering the engine, the system comprising:
    a controller configured to,
        receive shift data indicative of an execution of the shift event by the multi-ratio transmission,
        receive first sensor data indicative of a temperature of the engine and second sensor data indicative of a temperature of the multi-ratio transmission,
        obtain a transient air value based on the temperature of the engine and the temperature of the multi-ratio transmission when the controller has received the shift data, and
        signal the throttle valve to move to a position corresponding to the transient air value when the controller has received the shift data.

2. The system according to claim 1, wherein the controller is configured to obtain the transient air value based on a current gear selection and a target gear selection.

3. The system according to claim 1, wherein the controller is configured to correct the transient air value based on a calculated difference between a target engine speed and an actual engine speed, where the actual engine speed is measured during the shift event and the target engine speed is based on the engine temperature and a current gear selection.

4. The system according to claim 1, wherein controller is configured to obtain the transient air value by retrieving the transient air value from a table that includes a plurality of predetermined transient air values, a plurality of engine temperature values and a plurality of transmission temperature values.

5. The system according to claim 1, wherein
the shift data includes data indicative of a current gear selection and a target gear selection, and
the controller is configured to,
select one of a plurality of tables based on the current gear selection and the target gear selection, each of the tables includes a respective plurality of predetermined transient air value, a respective plurality of engine temperature values and a respective plurality of transmission temperature values, and
obtain the transient air value by retrieving the transient air value from the one of the plurality of tables based on the temperature of the engine and the temperature of the multi-ratio transmission.

6. The system according to claim 1, wherein the temperature of the engine is a temperature of a coolant fluid flowing through the engine.

7. The system according to claim 1, wherein the temperature of the multi-ratio transmission is a temperature of a working fluid in the multi-ratio transmission.

8. The system according to claim 1, wherein the controller is configured to,
receive data indicative of an actual engine speed measured during the shift event,
calculate a speed difference between the actual engine speed and a target engine speed based on the engine temperature,
selectively correct the transient air value by,
decreasing the transient air value by a correction value if the speed difference is greater than a predetermined maximum threshold,
increasing the transient air value by the correction value if the speed difference is less than a predetermined minimum threshold, and
replacing the transient air value with the corrected transient air value, and
maintain the transient air value as unchanged if the speed difference is less than or equal to the predetermined maximum threshold and greater than or equal to the predetermined minimum threshold.

9. The system according to claim 8, wherein the controller is configured to obtain the correction value by calculating the correction value based on the speed difference.

10. The system according to claim 9, wherein the correction value is proportional to the speed difference.

11. The system according to claim 1, wherein controller is configured to,
determine a target engine speed based on the engine temperature and a current gear selection,
receive data indicative of an actual engine speed measured during the shift event,
determine a speed difference between the actual engine speed and the target engine speed,
determine a correction factor value based on the speed difference, and
correct the transient air value based on the correction factor value.

12. A powertrain for a vehicle comprising:
an internal combustion engine configured to output torque and including a throttle valve configured to selectively vary a flow rate of intake air that enters the internal combustion engine;
a transmission driven by the internal combustion engine, the transmission includes a plurality of gear ratios configured to selectively multiply the torque output by the internal combustion engine, and the transmission is configured to execute a shift event from a current gear selection to a target gear selection where,
the current gear selection is one of a plurality of gear selections,
the target gear selection is a different one of the gear selections, and
the plurality of gear selections includes a park selection and a plurality of ratio selections, and each of the ratio selections corresponds to a respective one of the gear ratios; and
a controller configured to,
receive shift data indicative of an execution of the shift event by the transmission,
receive first sensor data indicative of a temperature of the engine and second sensor data indicative of a temperature of the transmission,
obtain a transient air value based on the temperature of the engine and the temperature of the transmission when the controller has received the shift data, and
signal the throttle valve to move to a position corresponding to the transient air value when the controller has received the shift data.

13. The powertrain for a vehicle according to claim 12, further comprising:
a first sensor in thermal contact with the internal combustion engine and configured to output the first sensor data; and
a second sensor in thermal contact with the transmission and configured to output the second sensor data.

14. The powertrain according to claim 12, wherein the controller is configured to replace the transient air value with a corrected transient air value where,
the correction value is based on a difference between an actual engine speed and a target engine speed,
the actual engine speed is measured during the shift event, and
the target engine speed based on the engine temperature.

15. The powertrain according to claim 12, wherein the controller is configured to,
select one of a plurality of tables based on the current gear selection and the target gear selection, each of the tables includes a respective plurality of predetermined transient air value, a respective plurality of engine temperature values and a respective plurality of transmission temperature values, and
obtain the transient air value by retrieving the transient air value from the one of the plurality of tables based on the temperature of the engine and the temperature of the multi-ratio transmission.

16. A method for controlling an internal combustion engine during a shift event of a multi-ratio transmission driven by the internal combustion engine, the internal combustion engine including a throttle valve configured to selectively vary a flow rate of intake air that enters the internal combustion engine, the method comprising:
during the shift event, obtaining a transient air value based on a temperature of the engine and a temperature of the multi-ratio transmission measured, and during the shift event, signaling the throttle valve to move to a position corresponding to the transient air value.

17. The method according to claim 16, wherein obtaining the transient air value includes obtaining the transient air value based on a current gear selection and a target gear selection of the shift event.

18. The method according to claim 16, wherein obtaining the transient air value includes,
    selecting one of a plurality of data tables based on a current gear selection and a target gear selection of the shift event, each of the data tables includes a respective plurality of transient air value, a respective plurality of engine temperatures, and a respective plurality of transmission temperatures, and
    retrieving the transient air value from the one of the plurality of data tables.

19. The method according to claim 16, further comprising:
    determining a speed difference between an actual engine speed and a target engine speed, where the actual engine speed is a speed of the internal combustion engine measured during the shift event and the target engine speed is based on the engine temperature and a current gear ratio selection;
    determine a corrected transient air value based on the speed difference; and
    replacing the transient air value with the corrected transient air value.

20. The method according to claim 16, further comprising:
    determining a speed difference between an actual engine speed and a target engine speed, where the actual engine speed is a speed of the internal combustion engine measured during the shift event and the target engine speed based on the engine speed a current gear selection;
    decreasing the transient air value by a correction value to a corrected transient air value if the speed difference is greater than a predetermined maximum threshold,
    increasing the transient air value by the correction value to a corrected transient air value if the speed difference is less than a predetermined minimum threshold, and
    one of,
        replacing the transient air value with the corrected transient air value, and
        maintaining the transient air value as unchanged if the speed difference is less than or equal to the predetermined maximum threshold and greater than or equal to the predetermined minimum threshold.

* * * * *